(12) United States Patent
Talalai (10) Patent No.: US 7,298,827 B1
(45) Date of Patent: Nov. 20, 2007

(54) SYSTEM AND METHOD FOR TESTING A QUALITY OF TELECOMMUNICATION DATA

(75) Inventor: Alexander Talalai, Palo Alto, CA (US)

(73) Assignee: Spirent Communications, Rockville, MD (US)

( * ) Notice: Subject to any disclaimer, the term of this patent is extended or adjusted under 35 U.S.C. 154(b) by 626 days.

(21) Appl. No.: 10/656,560

(22) Filed: Sep. 5, 2003

(51) Int. Cl.
*H04M 1/24* (2006.01)
*H04M 3/08* (2006.01)
*H04M 3/22* (2006.01)

(52) U.S. Cl. ................ 379/1.04; 379/1.02; 379/26.01; 379/27.04; 379/10.01

(58) Field of Classification Search ...... 379/1.01–1.02, 379/1.04, 9.04, 10.01–10.03, 22.02, 27.03–27.04, 379/29.02, 80, 85, 88.01, 88.04, 88.16, 26.01; 704/4, 7, 200, 203, 205, 220, 224
See application file for complete search history.

(56) References Cited

U.S. PATENT DOCUMENTS

| | | | | |
|---|---|---|---|---|
| 5,633,909 A * | 5/1997 | Fitch | ................ | 379/29.01 |
| 5,649,304 A * | 7/1997 | Cabot | ................ | 455/67.14 |
| 5,794,188 A * | 8/1998 | Hollier | ................ | 704/228 |
| 5,890,104 A * | 3/1999 | Hollier | ................ | 704/201 |
| 5,933,475 A * | 8/1999 | Coleman | ................ | 379/10.01 |
| 6,205,202 B1 * | 3/2001 | Yoshida et al. | ................ | 379/27.02 |
| 6,304,634 B1 * | 10/2001 | Hollier et al. | ................ | 379/22.02 |
| 6,504,905 B1 * | 1/2003 | Tsai et al. | ................ | 379/26.01 |
| 6,898,272 B2 * | 5/2005 | Talalai | ................ | 379/10.03 |
| 2004/0193974 A1 * | 9/2004 | Quan et al. | ................ | 714/724 |

\* cited by examiner

*Primary Examiner*—Binh K. Tieu
(74) *Attorney, Agent, or Firm*—Martine Penilla & Gencarella, LLP (57) ABSTRACT

An invention is provided for testing a quality of communication data received from a SUT. The invention includes storing reference test data comprising a plurality of data segments, and receiving degraded test data also comprising a plurality of data segments, from the SUT. The data segments are located in the degraded test data, and data segments in the degraded test data are matched to related data segments in the reference test data. Further, the data segments in the degraded test data are compared to corresponding data segments in the reference test data using a fixed point operation. In one aspect, the degraded test data can be normalized prior to locating the data segments, for example, utilizing a fixed point Fourier transform. Also, a receive filter can be applied to the normalized test data utilizing a fixed point operation. Further, a perceptual evaluation signal quality (PESQ) result can be generated based on the comparison of the data segments in the degraded test data to corresponding data segments in the reference test data. The PESQ result optionally can be stored to a quality of service (QoS) data file.

19 Claims, 7 Drawing Sheets

SYSTEM AND METHOD FOR TESTING A QUALITY OF TELECOMMUNICATION DATA

BACKGROUND OF THE INVENTION

1. Field of the Invention

This invention relates generally to telecommunication, and more particularly to high density perceptual evaluation of sound quality.

2. Description of the Related Art

Today, modern telecommunications systems often perform complex operations when transmitting signals through the telecommunications network. These operations generally have non-linear effects on the signal inputs. As a result, it is often not possible to model the effects of the network by simulating the additive affect of each component of the network. In particular, the affect of the network on speech is not easily derivable from studying the network's affect on a simple test signal such as a sine wave.

Figure 1:
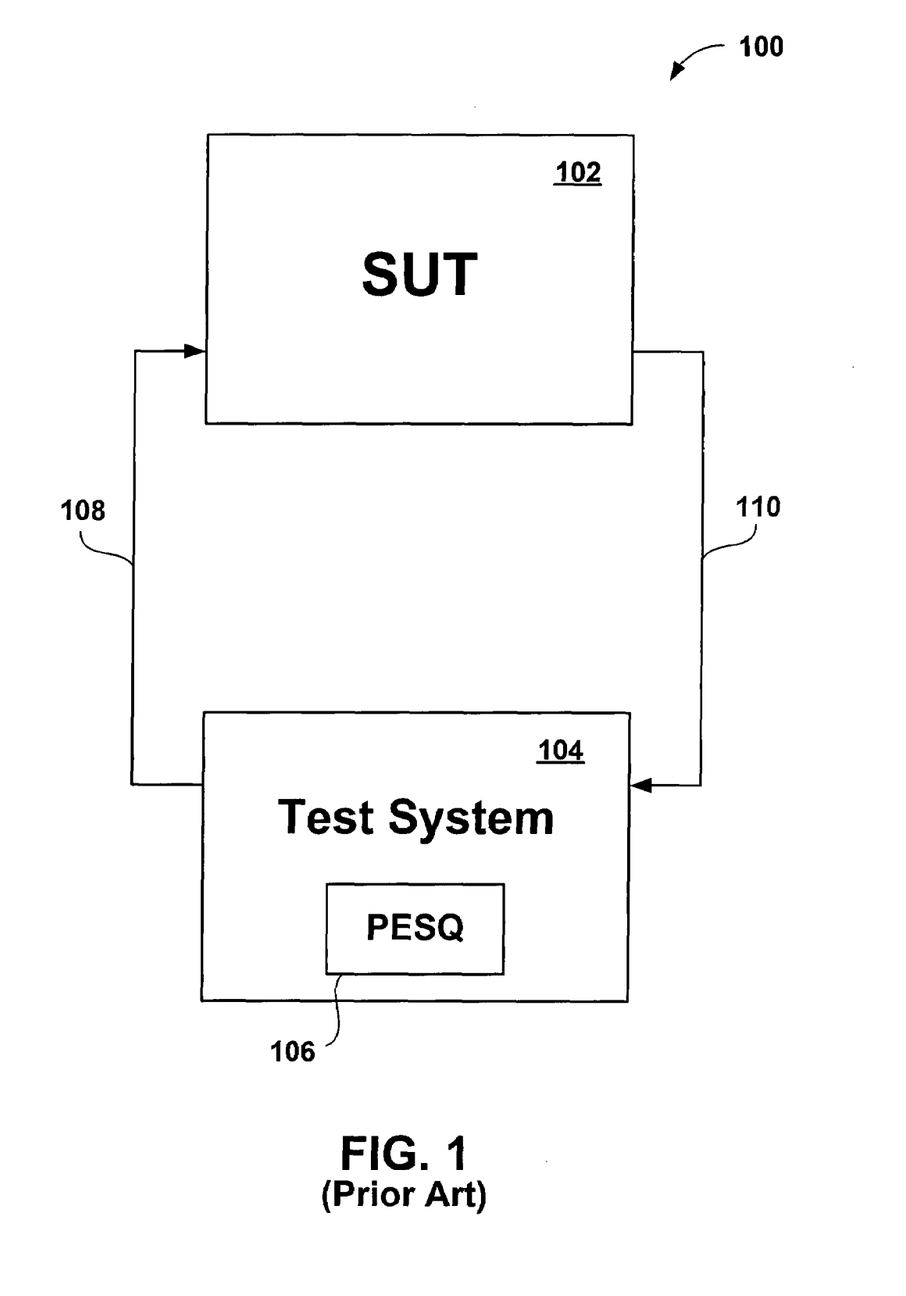
FIG. 1 is a block diagram showing an exemplary prior art telecommunication testing configuration.

Hence, voice communication signals generally are tested using voice generation and analyzing equipment in the form of a telecommunication testing system. FIG. 1 is a block diagram showing an exemplary prior art telecommunication testing configuration 100. As shown in FIG. 1, the telecommunication testing configuration 100 includes a system under test (SUT) 102, such as a telecommunication system, in communication with a test system 104. One technique for testing the SUT 102 for voice quality of service (QoS) is call generation.

Call Generation is a testing mode in which the test system 104 creates telephone traffic by executing compiled call sequences (scripts). Typically, the test system 104 provides a maximal load on the SUT 102 to test the SUT 102. In particular, the test system 104 places voice data 108 on the input channels of the SUT 102 and receives degraded output data 110 from the SUT 102 in real time. Once received, the degraded output data 110 is tested using a perceptual evaluation of sound quality (PESQ) unit 106, as illustrated in FIG. 2.

Figure 2:
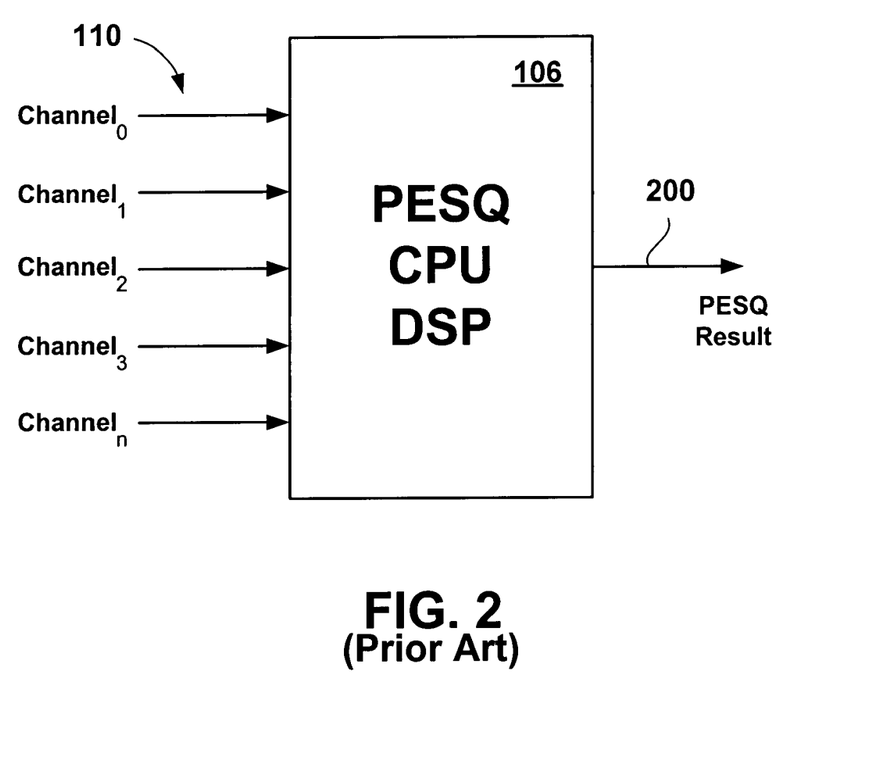
FIG. 2 is a block diagram showing a conventional PESQ unit.

FIG. 2 is a block diagram showing a conventional PESQ unit 106. The PESQ unit 106 receives degraded output data 110 from the SUT using a plurality of input channels. PESQ is calculated for each channel, not for a channels set, as it may be understood from the description. Once received, the PESQ unit 106 compares the degraded output data 110 to reference data to determine the perceptual evaluation of sound quality of the degraded output data 110. This quality is represented by a number referred to as a PESQ result 200. Generally, the PESQ result 200 is a number having a value between −0.5 and 4.5, which indicates the signal quality of the data returned from the SUT. Typically, a PESQ result value of 4.0-4.5 indicates high signal quality, while a PESQ result value bellow 2.0 indicates low signal quality.

Figure 3A:
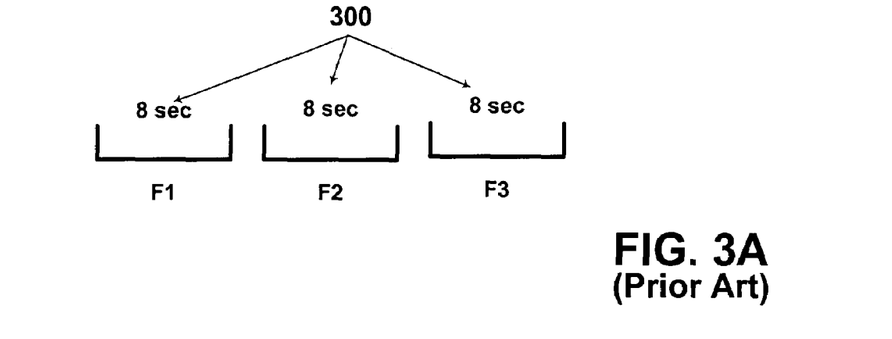
FIG. 3A illustrates voice data divided into three 8-second frames.
Figure 3B:
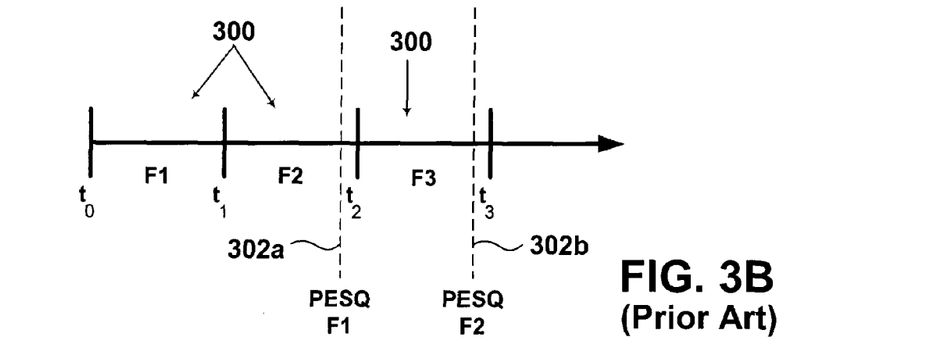
FIG. 3B illustrates frame processing sequencing during proper signal quality evaluation.

In operation, the PESQ unit 106 should calculate the PESQ result prior to the end of a subsequent data frame, as illustrated next with reference to FIGS. 3A-3C. FIG. 3A illustrates conventional exemplary frame data 300. Generally, degraded data output from the SUT is divided into frames 300 of voice data, for example, 8-second frames of voice data. For example, FIG. 3A illustrates voice data divided into three 8-second frames 300, the first frame F1, followed by the second frame F2 and the third frame F3.

In operation, the PESQ unit processes each frame F1-F3 of the frame data 300 to determine the PESQ result for the particular frame. However, as mentioned above, each frame F1-F3 should be fully processed before the end of the subsequent frame, as illustrated in FIG. 3B. FIG. 3B illustrates a frame processing sequencing during proper signal quality evaluation. As shown in FIG. 3B, processing is started on the first frame F1 at time $t_0$ and completed at time $t_1$. Similarly, processing is started on the second frame F2 at time $t_1$ and completed at time $t_2$, and processing is started on the third frame F3 at time $t_2$ and completed at time $t_3$.

Thus, for proper signal quality evaluation, frame F1 should be processed prior to the end of frame F2. That is, the PESQ result for frame F1 should be calculated prior to time $t_2$, as shown by the PESQ F1 result 302a. Similarly, the PESQ result for frame F2 should be calculated prior to time $t_3$, as shown by the PESQ F2 result 302b. In this manner, the test system can process the voice data in real-time. However, if this cannot be maintained, problems can occur during voice data processing, as illustrated in FIG. 3C.

Figure 3C:
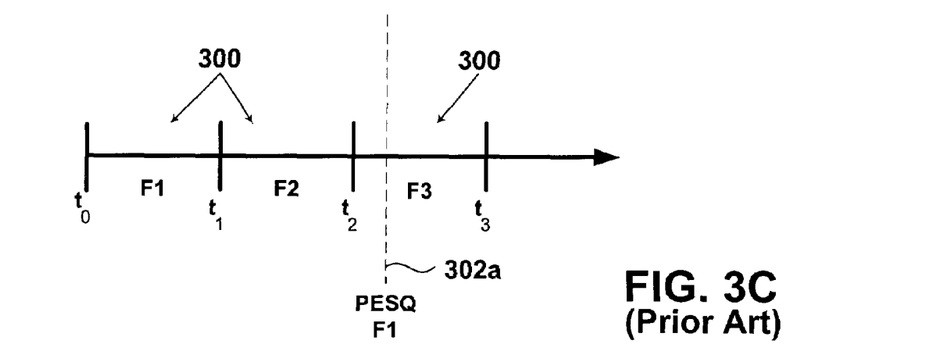
FIG. 3C illustrates improper frame processing sequencing during delayed signal quality evaluation.

FIG. 3C illustrates an improper frame processing sequencing during delayed signal quality evaluation. As above, processing is started on the first frame F1 at time $t_0$ and completed at time $t_1$. Similarly, processing is started on the second frame F2 at time $t_1$ and completed at time $t_2$, and processing is started on the third frame F3 at time $t_2$ and completed at time $t_3$. However, in the example of FIG. 3C, the PESQ F1 result 302a for the first frame F1 is not calculated until after the second frame F2 has been processed. That is, the PESQ F1 result 302a for the first frame F1 is not calculated until after time $t_2$. As a result, the test system will be unable to process the voice data in real-time and will experience problems because the voice data is entering the PESQ unit faster than the output of the unit is being generated. For example, if the PESQ result is not calculated before the subsequent frame is processed the PESQ unit will not evaluate some of incoming frames.

Process delays, such as that illustrated in FIG. 3C, can result from attempting to process too many voice data channels simultaneously. Thus, the speed of the test system defines the number of data channels the system can process simultaneously. For example, faster test systems can process more channels than slower test systems. Unfortunately, the prior art PESQ unit 106 is computationally slow, and as a result, prior art test systems are severely limited on the number of data channels that can be processed. Moreover, prior art PESQ units generally utilize floating point calculations, which can be exceedingly slow on PESQ DSPs that do not have co-processors to assist in floating point calculations.

In view of the foregoing, there is a need for systems and methods for high density telecommunication testing. The systems and methods should be capable of performing quality of service (QoS) testing on the SUT, and further, should support an increased number of simultaneous data channels without distorting the performance of the SUT.

SUMMARY OF THE INVENTION

Embodiments of the present invention address these needs by providing a telecommunications testing system that utilizes a fixed point based perceptual evaluation of sound quality logic to increase computational speed. As a result, a telecommunications testing system of the embodiments of the present invention can support an increased number of simultaneous data channels. In one embodiment, a method is disclosed for testing a quality of communication data received from a SUT. The method includes storing reference test data comprising a plurality of data segments, and receiving degraded test data, which comprises a plurality of data segments, from the SUT. The data segments are located in the degraded test data matched to related data segments in the reference test data. Further, the data segments in the degraded test data are compared to the corresponding data segments in the reference test data using a fixed point operation. In one aspect, the degraded test data can be normalized prior to locating the data segments, for example, utilizing a fixed point Fourier transform. Also, a receive filter can be applied to the normalized test data utilizing a fixed point operation. Further, a perceptual evaluation signal quality (PESQ) result can be generated based on the comparison of the data segments in the degraded test data to corresponding data segments in the reference test data. The PESQ result optionally can be stored to a QoS data file.

A system for testing a quality of communication data received from a SUT is disclosed in a further embodiment of the present invention. The system includes an encoder that encodes reference test data. As above, the reference test data comprises a plurality of data segments. The system also includes a decoder that decodes degraded test data received from the SUT in real-time during testing of the SUT. As with the reference test data, the degraded test data comprises a plurality of data segments. Further included in the system is a fixed point based logic unit that compares the data segments in the degraded test data to corresponding data segments in the reference test data using a fixed point operation. In one aspect, the fixed point based logic locates data segments in the degraded test data and corresponds data segments in the degraded test data to related data segments in the reference test data. The fixed point based logic also can normalize the degraded test data prior to locating the data segments using a fixed point Fourier transform, and then apply a receive filter to the normalized test data utilizing a fixed point operation.

In a further embodiment, a computer program embodied on a computer readable medium is disclosed for testing a quality of communication data, typically speech data, received from a SUT. The computer program includes program instructions that store reference test data comprising a plurality of data segments, and program instructions that receive degraded test data from the SUT. As above, the received degraded test data comprises a plurality of data segments. Program instructions are also include that locate the data segments in the degraded test data, and that correspond data segments in the degraded test data to related data segments in the reference test data. The computer program further includes program instructions that compare the data segments in the degraded test data to corresponding data segments in the reference test data using a fixed point operation. Optionally, the computer program can include program instructions that normalize the degraded test data prior to locating the data segments utilizing a fixed point Fourier transform. Similarly, program instructions can be included that apply a receive filter to the normalized test data utilizing a fixed point operation. Similar to above, the computer program can include program instructions that generate a PESQ result based on the comparison of the data segments in the degraded test data to corresponding data segments in the reference test data. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a telecommunications testing system that utilizes a fixed point based perceptual evaluation of sound quality logic to increase computational speed. As a result, a telecommunications testing system of the embodiments of the present invention can support an increased number of simultaneous data channels. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 4:
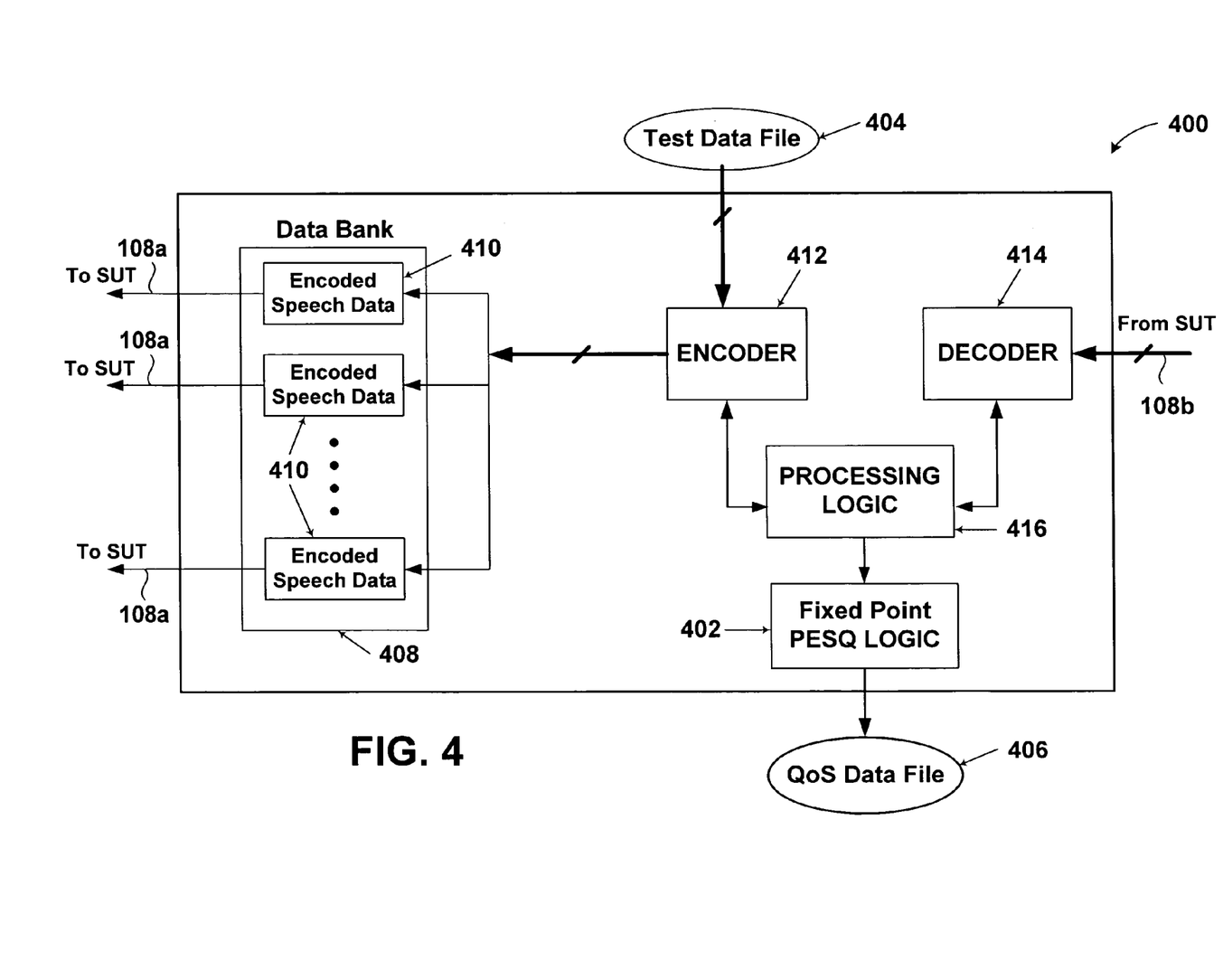
FIG. 4 is a block diagram showing a telecommunication test system having fixed point based PESQ logic, in accordance with an embodiment of the present invention.

FIGS. 1-3C have been described above in terms of the prior art. FIG. 4 is a block diagram showing a telecommunication test system 400 having fixed point based PESQ logic, in accordance with an embodiment of the present invention. The test system 400 includes an encoder 412 and a decoder 414. In communication with both the encoder 412 and the decoder 414 is processing logic 416 that coordinates the process flow of the various system components. Further, fixed point PESQ logic 402 is included that determines the QoS of the SUT. Coupled to the encoder 412 is a data bank 408, which is used to store the encoded speech data 410.

Embodiments of the present invention preprocess test data prior to testing the SUT. In one embodiment, the encoder 412 receives a test data file 404, which includes speech data that will be utilized as test data for the SUT. For example, the speech data can comprise a plurality of spoken sentences specifically selected to test various aspects of the SUT. To reduce the amount of data transmitted on the data channels, the speech data from the test data file 404 is compressed using the encoder 412, which encodes the speech data into a format the SUT will expect to receive. The encoded speech data 410 is stored in the data bank 408 for later use during testing of the SUT.

During actual testing of the SUT, the stored encoded speech data 410 is transmitted to the SUT, which decodes and processes the speech data. The SUT then encodes the processed speech data using a codec and transmits the encoded speech data to the test system 400. Once received, the test system decodes the speech data using the decoder 414 of the test system 400. The test system 400 can then analyze the speech data using the fixed point PESQ logic 402.

As will be described in greater detail subsequently, the fixed point PESQ logic 402 compares the processed speech data to reference speech data, such as the test data file 404. The fixed point PESQ logic 402 then generates PESQ result data based on the comparison and stores the PESQ result data in a QoS data file 406 for later use. The QoS data file 406 can be stored, for example, on mass storage and/or removable storage such as floppy disks, CD-Rs, CD-RWs, and/or DVDs. Optionally, the QoS data file 406 can be transmitted to other computer systems using a network, such as a local area network (LAN) and/or a wide area network (WAN), such as the Internet.

As will be appreciated, a test system of the embodiments of the present invention can originate and terminate a call through a switch or similar telecommunication device. Moreover, the circuit type of the originating channel can be the same as or different from that of the terminating channel. That is, the encoder 304 can encode the speech data into one particular format, such as PCM, and the encoder 306 can be designed to receive and decode data encoded in a different format, such as ADPCM. As such, embodiments of the present invention can be utilized to create multiple telephone calls, answer calls, confirm that calls are correctly established, create and respond to unique tones, measure and display call statistics in real time, and generate calls on one circuit type and terminate calls on another circuit type.

Figure 5:
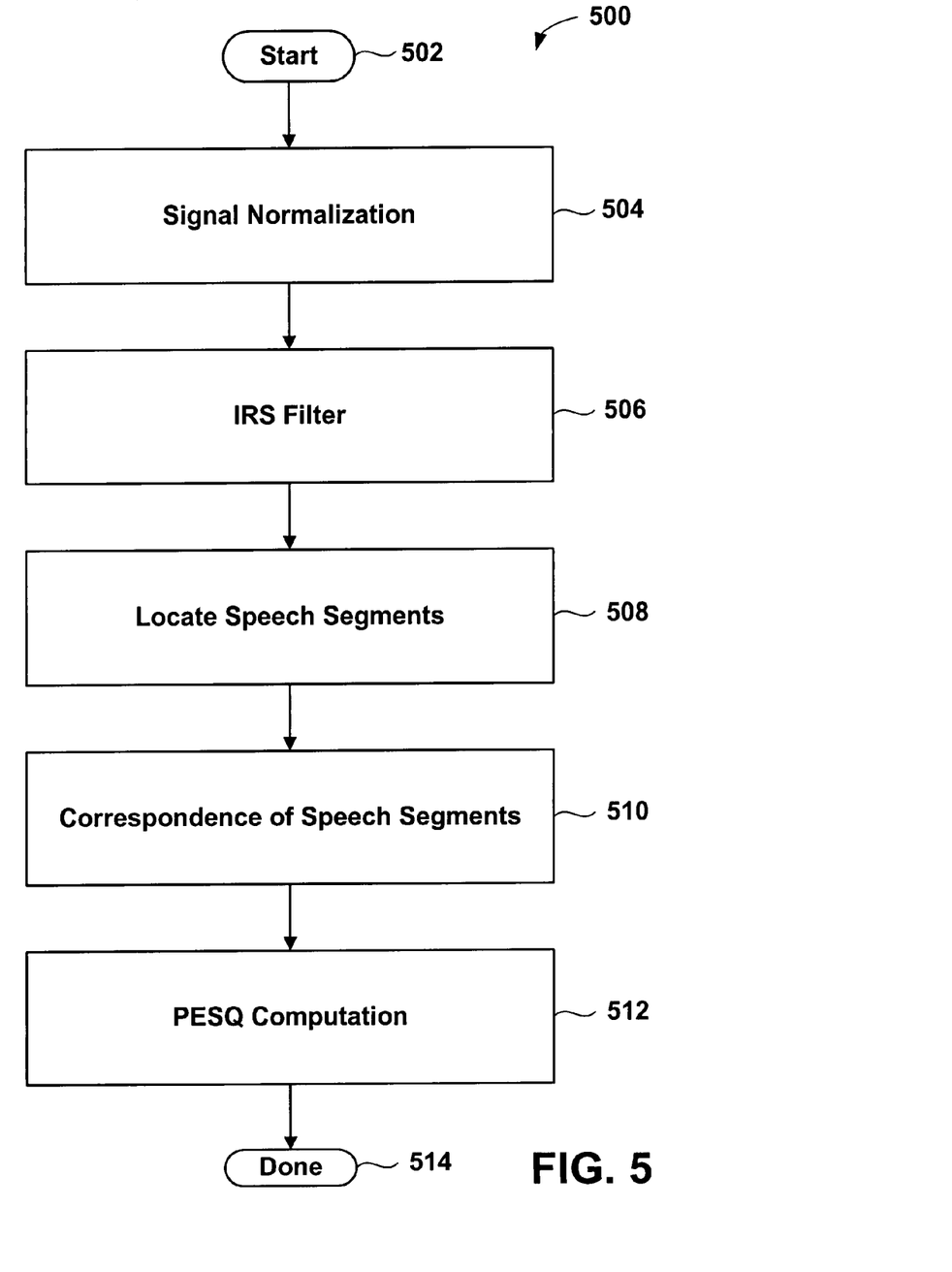
FIG. 5 is a flowchart showing a method for generating PESQ result data using fixed point based PESQ computational logic, in accordance with an embodiment of the present invention.

FIG. 5 is a flowchart showing a method for generating PESQ result data using fixed point based PESQ computational logic, in accordance with an embodiment of the present invention. Preprocess operations are performed in operation 502. Preprocess can include generating reference test data, transmitting the reference test data to a SUT, receiving degraded speech data from the SUT, and other preprocess operations that will be apparent to those skilled in the art after a careful reading of the present disclosure.

In operation 504, signal normalization is performed. More specifically, the amplitude of the received signal is brought to a particular energy level. As discussed above, speech data is represented in the test system using a sequence of frames of speech data. The speech data itself comprises a plurality of values that represent the amplitude of a membrane during specific times during the data frame, as illustrated in FIG. 6.

Figure 6:
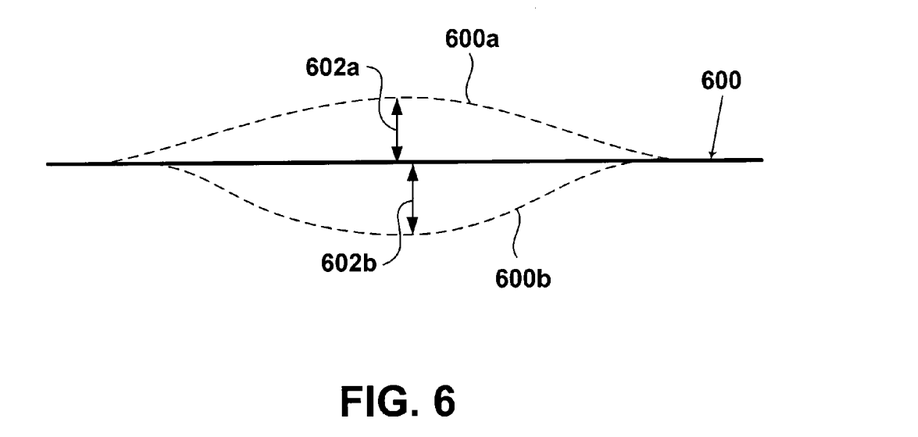
FIG. 6 is a pictorial representation of speech data showing amplitude values for an exemplary membrane.

FIG. 6 is a pictorial representation of speech data showing amplitude values for an exemplary membrane 600. As illustrated in FIG. 6, speech data represents the various amplitude values 602a-602b for an exemplary membrane 600 during a frame of speech data. Specifically, the amplitude 602a is a measure of the distortion of the membrane 600 needed to reproduce a particular sound. Similarly, amplitude 602b is a measure of the distortion of the membrane 600 needed to reproduce a particular sound, however, amplitude 602b is in a direction opposite that of amplitude 602a. Generally, this amplitude is expressed as a 16-bit value, which can vary from about $-2^{15}$ to about $2^{15}-1$. Thus, referring back to FIG. 5, the signal is normalized such that an average of the energy of the signal is a particular value. As a result, the speech data signal is brought a particular energy level for subsequent computation.

In operation 506, an IRS (Intermediate Reference System) filter is applied to the speech data. As is known, IRS stands for a typical phone receiver. Broadly speaking, the IRS filter operates as a receive filter for the speech data. As described above, during testing the test system transmits reference data to the SUT and receives degraded speech data from the SUT. However, the actual receiver utilized to receive the degraded data can introduce noise or changes into the speech data, which should not be viewed by the test system as further data degradation. The IRS filter simulates a telephone receiver and filters out low and high harmonics of the incoming signal. For instance, it is desired to compare reference and degraded data after it passes a receiver, and not before.

Figure 7:
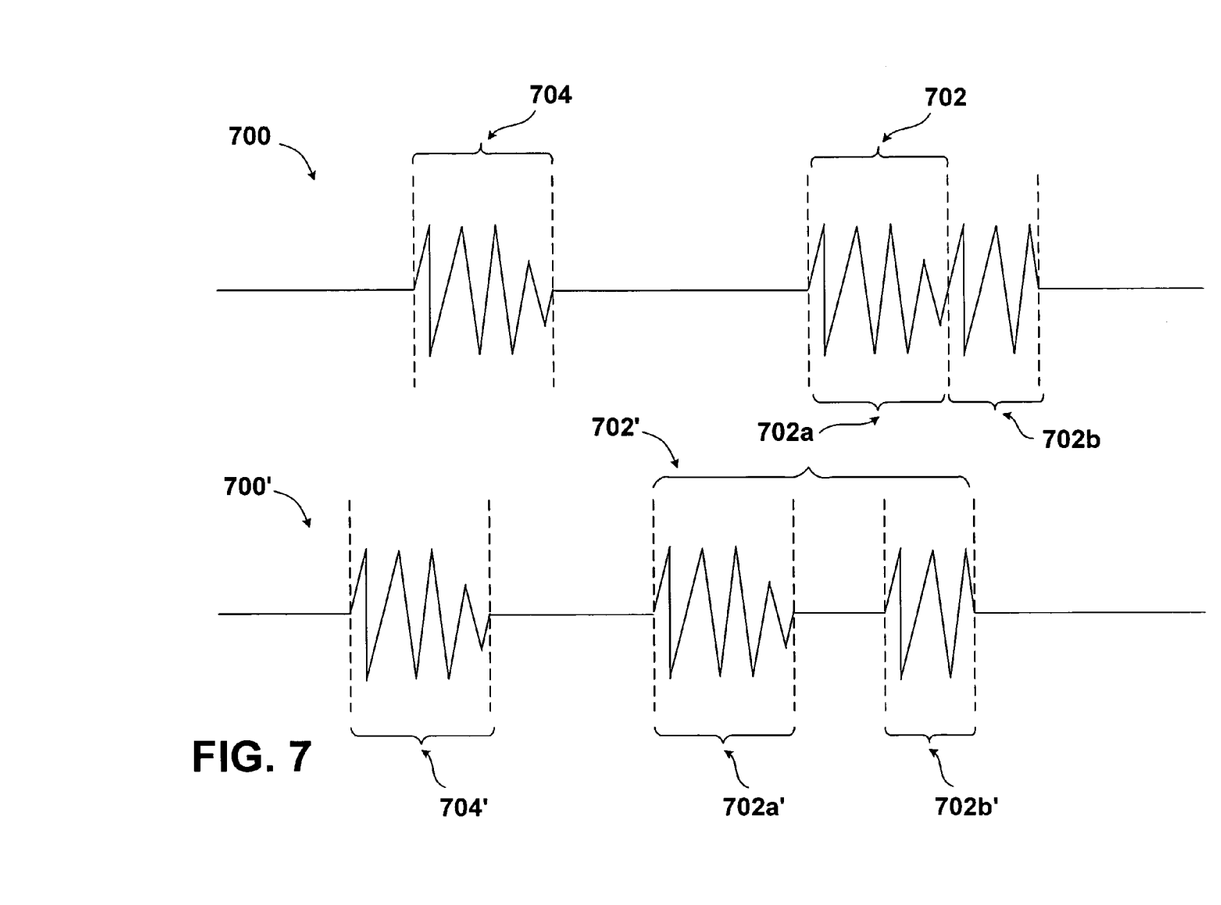
FIG. 7 shows an exemplary reference speech data frame and a corresponding degraded speech data frame.

Speech segments then are located within the degraded speech data frame and the corresponding reference speech data frame, in operation 508. FIG. 7 shows an exemplary reference speech data frame 700 and a corresponding degraded speech data frame 700'. The reference speech data frame 700 illustrates a frame having two speech segments, a first segment 702 followed by a second segment 704. During operation 508, the test system examines the reference speech data frame 700 to obtain the location of the first segment 702 and the second segment 704.

In addition, the test system examines the degraded speech data frame 700'. Because of delays and other transmission properties, the degraded speech data frame 700' may be slightly time shifted and/or broken with respect to the reference speech data frame 700. For example, in FIG. 7 the first and second degraded speech segments 702' and 704' are slightly delayed as compared to the first and second speech segments 702 and 704 in the reference speech data frame 700. In addition, the first degraded segment 702' has been broken into two sub-segments 702a' and 702b', which correspond to sub-segments 702a and 702b of the reference speech data frame 700. Hence, during operation 508, the locations of the speech segments and sub-segments of the reference and degraded speech data frames are determined.

Referring back to FIG. 5, the speech segments from the degraded speech data frame are linked to corresponding speech segments from the reference speech data frame, in operation 510. Since it is known that the degraded speech data frame is similar to the reference speech data frame, a correspondence of signal data is calculated in operation 510. For example, turning to FIG. 7, the test system examines the degraded speech data sub-segment 702b' and attempts to find corresponding speech sub-segment in the reference speech data frame 700. In this case, the test system will correspond the degraded speech sub-segment 702b' with the reference speech sub-segment 702b. In a similar manner, the test system will correspond the degraded speech sub-segment 702a' with the reference speech sub-segment 702a, and the degraded speech segment 704' with the reference speech segment 704.

Once a correspondence is found, the test system performs fixed-point based PESQ operations to generate the PESQ result, in operation 512. More specifically, the test system compares corresponding speech segments to generate the PESQ result for the frame. Post process operations then are performed in operation 514. Post process operations can include storing the PESQ result in a quality of service file, analyzing the quality of service file, and other post process operations that will apparent to those skilled in the art after a careful reading of the present disclosure.

As mentioned above, embodiments of the present invention increase processing speed and efficiency by utilizing fixed point signal processing. Unlike floating point signal processing, fixed point signal processing does not require co-processors for processing efficiency. Further, fixed point signal processing can be performed much faster than floating point signal processing. In particular, embodiments of the present invention utilize a 32-bit fast Fourier transform to process degraded data. A Fourier transform decomposes or separates a waveform or function into sinusoids of different frequency which sum to the original waveform. It identifies or distinguishes the different frequency sinusoids and their respective amplitudes. For example, for sound files up to 8 sec. long, a Fourier transform for up to 8192 samples may be used.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for testing a quality of communication data received from a system under test (SUT), comprising:
   storing reference test data comprising a plurality of data segments;
   transmitting the reference test data through the SUT;
   receiving a degraded version of the reference test data from the SUT, wherein degradation within the degraded version of the reference test data is caused by transmission of the reference test data through the SUT;
   locating the plurality of data segments in the degraded version of the reference test data; and
   comparing each of the plurality of data segments in the degraded version of the reference test data to the corresponding data segment in the reference test data using a fixed point operation to evaluate a level of degradation within the degraded version of the reference test data.

2. A method as recited in claim 1, further comprising normalizing the degraded version of the reference test data prior to locating the plurality of data segments.

3. A method as recited in claim 2, wherein the degraded version of the reference test data is normalized utilizing a fixed point Fourier transform.

4. A method as recited in claim 3, further comprising:
   applying a receive filter to the normalized degraded version of the reference test data utilizing a fixed point operation.

5. A method as recited in claim 4, wherein the reference test data is speech data.

6. A method as recited in claim 1, further comprising:
   generating a perceptual evaluation signal quality (PESQ) result based on a result of comparing each of the plurality of data segments in the degraded version of the reference test data to the corresponding data segment in the reference test data.

7. A method as recited in claim 6, further comprising:
   storing the PESQ result to a quality of service (QoS) data file.

8. A system for testing a quality of communication data received from a system under test (SUT), comprising:
   an encoder defined to encode reference test data, the reference test data comprising a plurality of data segments;
   transmitter logic defined to transmit the encoded reference test data through the SUT;
   receiver logic defined to receive a degraded version of the encoded reference test data from the SUT, wherein degradation within the degraded version of the encoded reference test data is caused by transmission of the encoded reference test data through the SUT;
   a decoder defined to decode the degraded version of the encoded reference test data received from the SUT in real-time during testing of the SUT to obtain a degraded version of the reference test data; and
   a fixed point based logic unit defined to compare each of a plurality of data segments in the degraded version of the reference test data to a corresponding data segment in the reference test data using a fixed point operation to evaluate a level of degradation within the degraded version of the reference test data.

9. A system as recited in claim 8, wherein the fixed point based logic is defined to locate each of the plurality of data segments in the degraded version of the reference test data.

10. A system as recited in claim 9, wherein the fixed point based logic is defined to correlate each of the plurality of data segments in the degraded version of the reference test data to the corresponding data segment in the reference test data.

11. A system as recited in claim 10, wherein the fixed point based logic is defined to normalize the degraded version of the reference test data using a fixed point Fourier transform prior to locating each of the plurality of data segments in the degraded version of the reference test data.

12. A system as recited in claim 11, wherein the fixed point based logic is defined to apply a receive filter to the normalized degraded version of the reference test data using a fixed point operation.

13. A system as recited in claim 12, wherein the reference test data is speech data.

14. A computer readable medium having program instructions stored thereon for testing a quality of communication data received from a system under test (SUT), comprising:

program instructions that store reference test data comprising a plurality of data segments;

program instructions that transmit the reference test data through the SUT;

program instructions that receive a degraded version of the reference test data from the SUT, wherein degradation within the degraded version of the reference test data is caused by transmission of the reference test data through the SUT;

program instructions that locate the plurality of data segments in the degraded version of the reference test data;

and program instructions that compare each of the plurality of data segments in the degraded version of the reference test data to the corresponding data segment in the reference test data using a fixed point operation to evaluate a level of degradation within the degraded version of the reference test data.

15. A computer readable medium as recited in claim 14, further comprising:

program instructions that normalize the degraded version of the reference test data prior to locating the plurality of data segments in the degraded version of the reference test data.

16. A computer readable medium as recited in claim 15, wherein the degraded version of the reference test data is normalized using a fixed point Fourier transform.

17. A computer readable medium as recited in claim 16, further comprising:

program instructions that apply a receive filter to the normalized degraded version of the reference test data using a fixed point operation.

18. A computer readable medium as recited in claim 17, wherein the reference test data is speech data.

19. A computer readable medium as recited in claim 14, further comprising:

program instructions that generate a perceptual evaluation signal quality (PESQ) result based on the comparison of each of the plurality of data segments in the degraded version of the reference test data to the corresponding data segment in the reference test data.

* * * * *